(12) United States Patent
Fujiwara et al.

(10) Patent No.: US 10,040,087 B2
(45) Date of Patent: Aug. 7, 2018

(54) TRIGGER-TYPE LIQUID DISPENSER (71) Applicants: Kotaro Fujiwara, Tokyo (JP); Shigeo Iizuka, Tokyo (JP)

(72) Inventors: Kotaro Fujiwara, Tokyo (JP); Shigeo Iizuka, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 15/311,395

(22) PCT Filed: Apr. 27, 2015

(86) PCT No.: PCT/JP2015/002267
§ 371 (c)(1),
(2) Date: Nov. 15, 2016

(87) PCT Pub. No.: WO2015/182041
PCT Pub. Date: Dec. 3, 2015

(65) Prior Publication Data
US 2017/0113238 A1    Apr. 27, 2017

(30) Foreign Application Priority Data
May 30, 2014 (JP) .................................. 2014-113469

(51) Int. Cl.
B05B 11/00 (2006.01)
F16K 15/14 (2006.01)
B65D 83/32 (2006.01)

(52) U.S. Cl.
CPC ....... *B05B 11/3011* (2013.01); *B05B 11/3025* (2013.01); *B05B 11/3045* (2013.01);
(Continued)

(58) Field of Classification Search
CPC ............. B05B 11/3009; B05B 11/3011; B05B 11/3016; B05B 11/3018; B05B 11/3023;
(Continued)

(56) References Cited
U.S. PATENT DOCUMENTS 3,715,060 A * 2/1973 Benson ................ A47G 19/183
222/207
4,610,275 A * 9/1986 Beecher ................ F16K 15/148
137/854
(Continued)

FOREIGN PATENT DOCUMENTS

GB    1 320 103 A    6/1973
GB    2 146 740 A    4/1985
(Continued)

OTHER PUBLICATIONS

Aug. 15, 2017 Office Action issued in Japanese Patent Application No. 2014-113469.
(Continued)

*Primary Examiner* — Patrick M Buechner
(74) *Attorney, Agent, or Firm* — Oliff PLC (57) ABSTRACT A trigger-type liquid dispenser includes valve member, which is provided in flow path to control liquid to flow in direction in flow path. Valve member includes intake-side check valve, which permits flow of liquid from container side to pump side and prevents flow of liquid from pump side to container side, and discharge-side check valve, which permits flow of liquid from pump side to nozzle side and prevents flow of liquid from nozzle side to pump side. Discharge-side check valve is formed in umbrella shape that is elastically deformable freely in radial direction and has outer circumferential end configured to contact inner circumferential surface of flow path, with contact force of outer circumferential end with respect to inner circumferential (Continued)

surface of flow path being distributed non-uniformly in circumferential direction.

15 Claims, 5 Drawing Sheets

(52) U.S. Cl.
CPC ...... *B05B 11/3067* (2013.01); *B05B 11/3077* (2013.01); *F16K 15/14* (2013.01); *F16K 15/145* (2013.01); *F16K 15/148* (2013.01); *B65D 83/32* (2013.01)

(58) Field of Classification Search
CPC ............. B05B 11/3057; B05B 11/3056; B05B 11/3064; B05B 11/3066; B05B 11/3067; B05B 11/3069; B05B 11/307; B05B 11/3025; B05B 11/3045; B05B 11/3077; B65D 83/32; F16K 15/14; F16K 15/145; F16K 15/148
USPC ................................ 137/843, 852, 853, 854
See application file for complete search history.

(56) References Cited

U.S. PATENT DOCUMENTS

| | | |
|---|---|---|
| 4,632,151 A | 12/1986 | Glover |
| 2002/0066802 A1* | 6/2002 | Tada ..................... B05B 7/0018 239/333 |
| 2004/0000348 A1* | 1/2004 | Persson ................. F16K 15/145 137/853 |

FOREIGN PATENT DOCUMENTS

| | | |
|---|---|---|
| JP | S60-7952 A | 1/1985 |
| JP | H10-151384 A | 6/1998 |
| JP | 2000-176332 A | 6/2000 |
| JP | 3647583 B2 | 5/2005 |
| WO | 2013/035316 A1 | 3/2013 |

OTHER PUBLICATIONS

Aug. 17, 2017 Office Action issued in Australian Patent Application No. 2015265399.

Jul. 14, 2015 International Search Report issued in International Patent Application No. PCT/JP2015/002267.

Dec. 6, 2016 International Preliminary Report on Patentability issued in International Patent Application No. PCT/JP2015/002267.

Dec. 11, 2017 Office Action issued in Canadian Application No. 2,948,886.

Dec. 13, 2017 Extended European Search Report issued in European Application No. 15799828.7.

Feb. 19, 2018 Office Action issued in Korean Application No. 10-2016-7031824.

* cited by examiner

A-A section

TRIGGER-TYPE LIQUID DISPENSER

TECHNICAL FIELD

The present disclosure relates to a trigger-type liquid dispenser that is attached to a mouth of a container containing a liquid and that dispenses the liquid contained in the container through a nozzle in the form of spray or foam.

BACKGROUND

As a dispenser attached to a mouth of a container containing a liquid, such as an antimold, a detergent, a sizing agent for textiles, household wax, a hair liquid, and an aromatic, a trigger-type liquid dispenser is known. Such a trigger-type liquid dispenser may dispense the liquid through a nozzle in the form of spray or foam with use of a pump configured to be actuated in response to operation of a trigger.

Such a trigger-type liquid dispenser also includes a dispenser main body fitted to the mouth of the container by, for example, a fitting cap, and the dispenser main body is provided with a flow path communicating with the container, and the nozzle is fitted to a front end of the flow path. The pump is connected to a pump hole provided in the midway of the flow path, and, when the pump is actuated, the liquid contained in the container is pressure-fed along the flow path and dispensed to the outside through the nozzle.

The trigger-type liquid dispenser configured as above needs to control the liquid, which is pressure-fed within the flow path in conjunction with operation of the pump, that is to say, intake and discharge operation of the pump, to flow in a direction from the container side to the nozzle side. To this end, the flow path is provided inside thereof with a valve member serving as a check valve.

As described in, for example, Patent Literature 1, one of known examples of such a valve member includes a topped cylindrical-shaped intake-side check valve and an umbrella-shaped discharge-side check valve that are integrally provided. The intake-side check is disposed closer to the container than the pump hole in the flow path to permit flow of the liquid from the container side to the pump side and to prevent flow of the liquid from the pump side to the container side, and the discharge-side check valve is disposed closer to the nozzle than the pump hole in the flow path to permit flow of the liquid from the pump side to the nozzle side and to prevent flow of the liquid from the nozzle side to the pump side.

CITATION LIST

Patent Literature

PTL 1: Japanese Patent No. 3647583

SUMMARY

Technical Problem

However, in the valve member described in Patent Literature 1, the discharge-side check valve is formed in an umbrella shape (i.e., a frustoconical shape) with a uniform profile in the circumferential direction about the axis, and the discharge-side check valve is also disposed coaxially with the cylindrical-shaped flow path and configured to abut, with a uniform contact allowance, against an inner circumferential surface of the flow path over the entire circumference thereof. Accordingly, the discharge-side check valve is difficult to open unless pressure, applied to the discharge-side check valve due to discharge operation of the pump, is high enough to cause the discharge-side check valve to deform uniformly over the entire circumference thereof. This poses the problem that large operation force needs to be applied to the trigger for actuating the pump.

The present disclosure is to solve the above problem, and the present disclosure is to provide a trigger-type liquid dispenser that discharges the liquid in response to small operation force.

Solution to Problem

One of aspects of the present disclosure resides in a trigger-type liquid dispenser including a dispenser main body fitted to a mouth of a container containing liquid, a nozzle fitted to a front end of a flow path provided in the dispenser main body, a pump that is connected to a pump hole provided in a midway portion of the flow path and that is actuated in response to operation of a trigger, and a valve member that is provided in the flow path to control the liquid to flow in a direction from the container to the nozzle in the flow path in conjunction with actuation of the pump. The valve member includes an intake-side check valve that is disposed on an upstream side of the pump hole in the flow path to permit flow of the liquid from a container side to a pump side and to prevent flow of the liquid from the pump side to the container side, and a discharge-side check valve that is disposed on a downstream side of the pump hole in the flow path to permit flow of the liquid from the pump side to a nozzle side and to prevent flow of the liquid from the nozzle side to the pump side. The discharge-side check valve is formed in an umbrella shape that is elastically deformable freely in a radial direction thereof, and the discharge-side check valve has an outer circumferential end configured to contact an inner circumferential surface of the flow path, with contact force of the outer circumferential end with respect to the inner circumferential surface of the flow path being distributed non-uniformly in a circumferential direction thereof.

In the above trigger-type liquid dispenser according to the present disclosure, the discharge-side check valve preferably has an axis that is offset from an axis of the flow path.

In the above trigger-type liquid dispenser according to the present disclosure, the discharge-side check valve is preferably shaped in a manner such that a center position of the outer circumferential end thereof is offset from a center position of an inner circumferential end thereof.

Alternatively, in the above trigger-type liquid dispenser according to the present disclosure, the discharge-side check valve is preferably shaped in a manner such that the outer circumferential end thereof is inclined with respect to a surface extending perpendicularly to a direction of an axis of the flow path.

In the above trigger-type liquid dispenser according to the present disclosure, the valve member preferably further includes a fixed portion configured to be fixed in the flow path, and the intake-side check valve and the discharge-side check valve are preferably provided integrally with the fixed portion.

In the above trigger-type liquid dispenser according to the present disclosure, the discharge-side check valve is preferably provided inside thereof with a bar-shaped portion, and the valve member is preferably fixed in the flow path by the bar-shaped portion abutting against an inner wall of the flow path and by the fixed portion engaging with a stepped portion formed on the inner circumferential surface of the flow path.

In the above trigger-type liquid dispenser according to the present disclosure, the intake-side check valve is provided on a tip of an elastic support portion protruding from the fixed portion and configured to abut against a valve seat provided in the flow path.

Advantageous Effect

The present disclosure creates an easy-to-deform portion in the discharge-side check valve and reduces opening pressure for the discharge-side check valve at the time of actuating the pump. Accordingly, operation force needed to be applied to the trigger for actuating the pump is reduced, and operation of the trigger-type liquid dispenser is facilitated.

DETAILED DESCRIPTION

The present disclosure will be described in more detail below by illustration with reference to the drawings.

Figure 1:
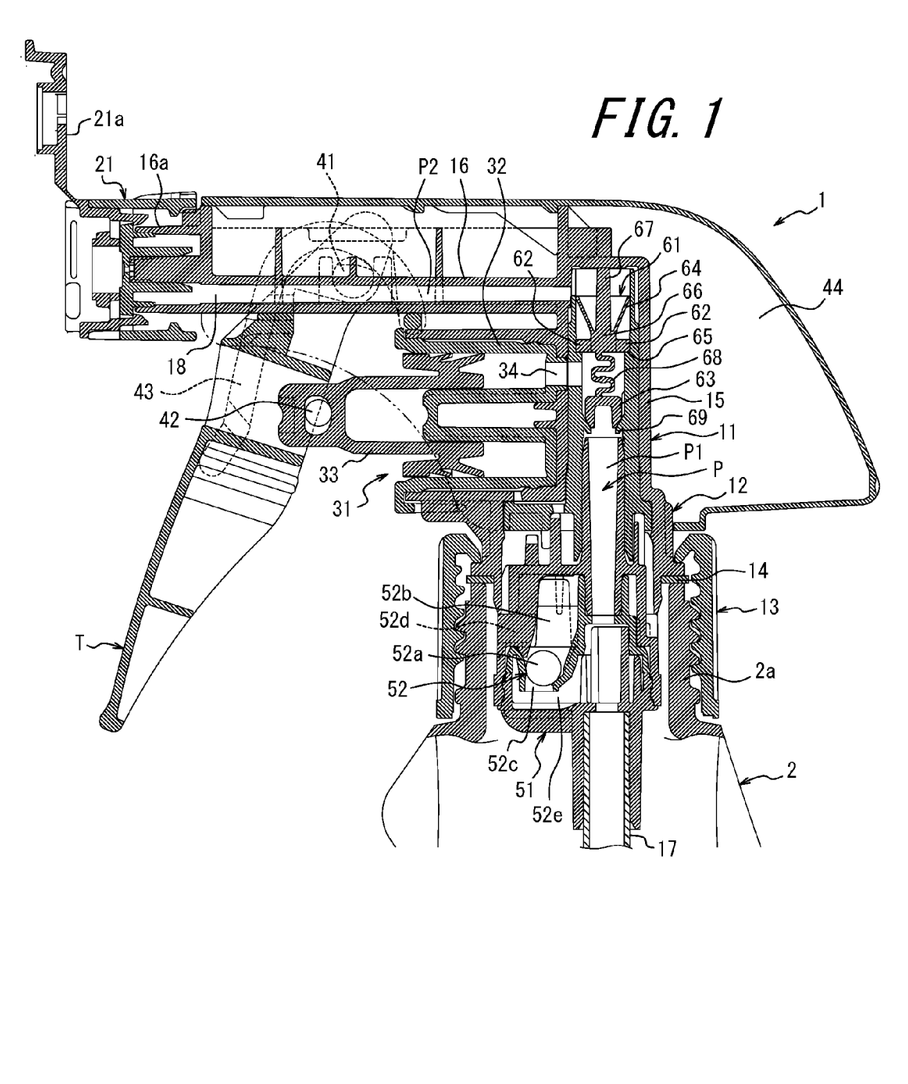
FIG. 1 is a sectional view of a trigger-type liquid dispenser according to one of embodiments of the present disclosure.

A trigger-type liquid dispenser 1 according to one of embodiments of the present disclosure illustrated in FIG. 1 may be, in use, attached to a mouth 2a of a container 2 containing a liquid, such as an antimold, a detergent, a sizing agent for textiles, household wax, a hair liquid, an aromatic, a repellent, a pesticide, and a medicine. The trigger-type liquid dispenser 1 includes a resin dispenser main body 11, which is fitted to the mouth 2a of the container 2, a nozzle 21, which is fitted to the dispenser main body 11, and a pump 31.

The dispenser main body 11 includes a cylindrical-shaped fitted tubular portion 12 in correspondence with the mouth 2a of the container 2, and the dispenser main body 11 is fitted to the mouth 2a of the container 2 by a fitting cap 13 being screw-connected to the mouth 2a of the container 2 in the state where the fitted tubular portion 12 is fitted to the mouth 2a of the container 2. Additionally, reference numeral 14 denotes a sealing member that seals between the mouth 2a of the container 2 and the fitted tubular portion 12.

The dispenser main body 11 is formed to have a substantially L-shaped appearance including a standing portion 15, which extends from the fitted tubular portion 12 in a direction extending along the central axis of the fitted tubular portion 12, and also including an extension portion 16, which extends in a direction orthogonal to the standing portion 15. The standing portion 15 is provided inside thereof with an intake flow path P1 communicating with the fitted tubular portion 12, and the intake flow path P1 has a lower end to which a drawing tube 17, which is inserted into the container 2, is connected. On the other hand, the extension portion 16 is provided with a delivery flow path P2, which extends in a direction orthogonal to the intake flow path P1, and the delivery flow path P2 has a front end, in which a delivery port 18 is defined in communication with the nozzle 21. In this way, the flow path P of the liquid in the dispenser main body 11 includes the intake flow path P1 and the delivery flow path P2.

The dispenser main body 11 is also provided, in a front end of the extension body 16, with a cylindrical-shaped fitting tube 16a, and the nozzle 21 is fitted to the fitting tube 16a while being prevented from slipping off. Inside the fitting tube 16a, the delivery port 18 of the delivery flow path P2 is open. Thus, the nozzle 21 is fitted to the front end of the delivery flow path P2 and permits the liquid, supplied through the delivery flow path P2, to be dispensed to the outside in the form of spray or foam.

Additionally, by fitting the nozzle 21 to the fitting tube 16a rotatably and rotating the nozzle 21, the nozzle 21 may be switched between an opened state where the liquid may be dispensed and a closed state where the liquid cannot be dispensed. Furthermore, the nozzle 21 may have a two-piece structure. Moreover, the nozzle 21 may be provided with a nozzle cover 21a, which may be opened and closed freely, and by dispensing the liquid while the nozzle cover 21a is in a closed state where the nozzle cover 21a covers a front surface of the nozzle 21, the liquid dispensed from the nozzle 21 is foamed more effectively.

The pump 31 includes a cylinder 32, which is attached to the dispenser main body 11, and a piston 33, which is assembled inside the cylinder 32 in a manner such that the piston 33 is freely displaceable. In a midway portion of the liquid flow path P provided in the dispenser main body 11, that is to say, between the intake flow path P1 and the delivery flow path P2, there is provided a pump hole 34. Via the pump hole 34, the inside of the cylinder 32 is connected to the flow path P, that is to say, the intake flow path P1 and the delivery flow path P2.

To the dispenser main body 11, a trigger (operation lever) T, which is rotatable about a pivot shaft 41, is fitted. The trigger T is coupled to a front end of the piston 33 by a pin member 42 in a manner such that the trigger T is rotatable. With the trigger T, a front end of a curve-shaped plate spring 43, which has one end fixed to and held by the dispenser main body 11, is engaged, and the plate spring 43 urges the trigger T toward a direction (i.e., a clockwise direction about the pivot shaft 41 in the figure) away from the pump 31.

Additionally, a cover 44 is fitted to the dispenser main body 11. The dispenser main body 11 and the pump 31 are covered by the cover 44, and the trigger T protrudes from a lower side of the cover 44.

Once the trigger T is operated manually and pulled toward the pump 31, the piston 33 is pushed in the cylinder 32, thereby permitting discharge operation of the pump 31. When operation of the trigger T is released, the trigger T is returned to an initial position due to resilience of the plate spring 43, thereby permitting intake operation of the pump 31. By thus repeating the pulling and the releasing operation of the trigger T, the pump 31 is actuated to draw the liquid contained in the container 2 into the pump 31 through the pump hole 34 via the intake flow path P1 and to discharge the liquid drawn into the pump 31 to the delivery flow path P2, that is to say, toward the nozzle 21, through the pump hole 34.

Additionally, the dispenser main body 11 and the pump 31 do not need to be configured as above, and it is possible to adopt a variety of configurations or structures, which permit the pump 31 to be actuated in response to operation of the trigger T to pressure-feed the liquid from the inside of the container 2 toward the nozzle Between the intake flow path P1 and the tube 17, there is provided an upright and inverted dual mechanism 51, which permits the liquid contained in the container 2 to be supplied to the pump 31 regardless of whether the container 2, to which the trigger-type liquid dispenser 1 is fitted, is in an upright or an inverted position.

The upright and inverted dual mechanism 51 includes a check valve unit 52. When the container 2 is in the upright position, the check valve unit 52 is in a closed state where a ball-shaped valve body 52a closes an outlet hole 52c of a valve chamber 52b, so that the liquid may be introduced to the intake flow path P1 via the tube 17. On the other hand, when the container 2 is in the inverted position, the check valve unit 52 is brought into an opened state by the valve body 52a being displaced in the valve chamber 52b in a direction away from the outlet hole 52c, so that the liquid pooled inside the fitted tubular portion 12 may be introduced from an inlet hole 52d, which is provided in a side wall of the check valve unit 52, to the intake flow path P1 via the valve chamber 52b, the outlet hole 52c, through a flow path 52e, which is used during inversion. Thus, the liquid contained in the container 2 may be supplied to the pump 31 both in the upright and the inverted position.

Figure 2:
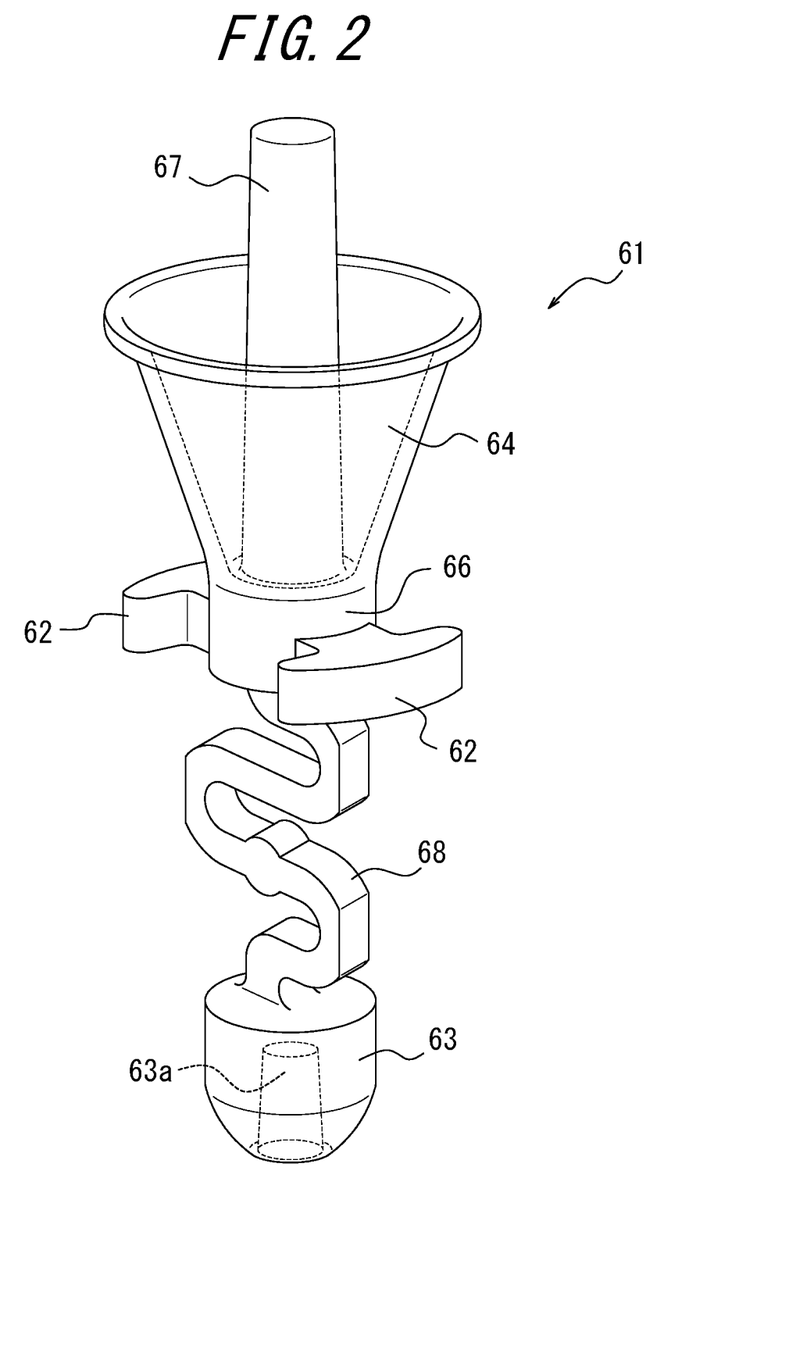
FIG. 2 is a perspective view of a valve member illustrated in FIG. 1.
Figure 3A:
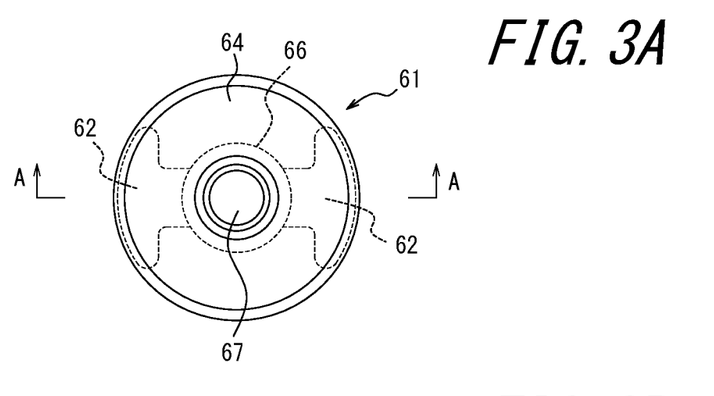
FIG. 3A is a plan view of a valve member illustrated in FIG. 2.
Figure 3B:
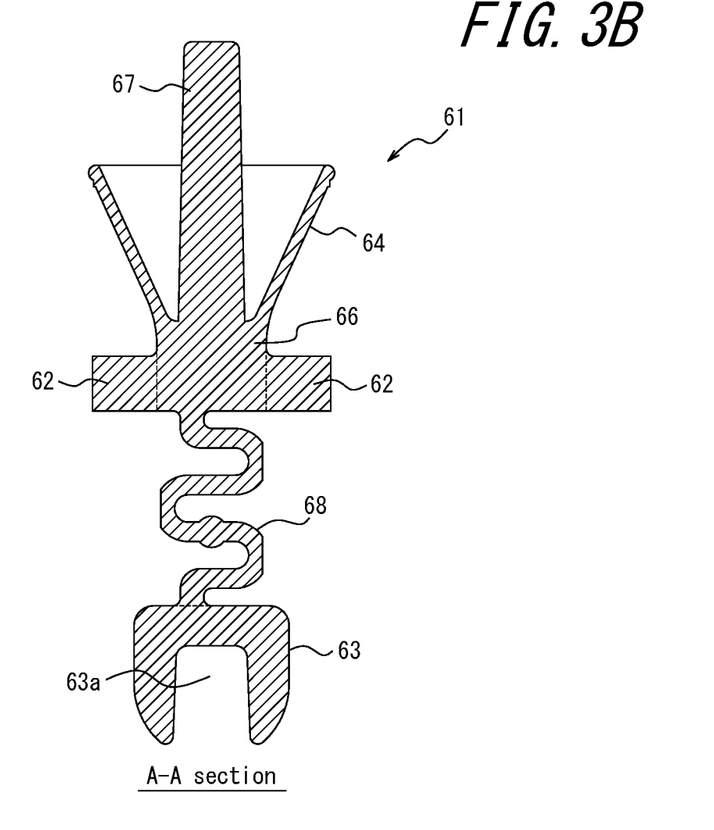
FIG. 3B is a sectional view taken along a line A-A illustrated in FIG. 3A.

To control the liquid to flow in a direction from the container 2 side to the nozzle 21 side in the flow path P in conjunction with actuation of the pump 31, a valve member 61 is provided inside the flow path P. As illustrated in FIG. 2 and FIGS. 3A and 3B, the valve member 61 may have an integrated structure including a fix portion 62, an intake-side check valve 63, and a discharge-side check valve 64, which are formed from a resin material.

The fix portion 62 is formed in a disc shape, and the fix portion 62 is fixed in the flow path P by abutting, from above, against a stepped portion 65, which is provided in an inner circumferential surface of a portion (i.e., an upper portion of the pump hole 34 in FIG. 1) within the flow path P that is located on the downstream side of the pump hole 34, and by being in undercut engagement. The fix portion 62 is also provided integrally with a columnar-shaped joining portion 66, and the joining portion 66 has an upper end that is provided coaxially and integrally with a bar-shaped portion 67. The bar-shaped portion 67 abuts, from below, against an inner wall in the flow path P that faces downward. In this way, one end surface of the fixed portion 62 abuts, from above, against the stepped portion 65, and the bar-shaped portion 67, provided integrally therewith, abuts, from below, against the inner wall of the flow path P, and accordingly, the fix portion 62 is fixed in the flow path P in a manner such that the fix portion 62 is not displaceable along the flow path P.

The fix portion 62 does not need to be configured as above and may be configured to be fixed in the flow path P in other ways, such as by press fitting or adhesion, for example.

As illustrated in FIG. 2 and FIGS. 3A and 3B, the fix portion 62 is formed in a substantially double T-shape protruding to the outer side in the radial direction from an outer circumferential surface of the joining portion 66. Accordingly, even when the fix portion 62 is fixed in the flow path P, a flow passageway for the liquid from the pump hole 34 toward the delivery flow path P2 is secured.

The fix portion 62 is provided, on a lower surface thereof, integrally with an elastic support portion 68 protruding downward, and the elastic support portion 68 is provided, on a tip (i.e., a lower end) thereof, integrally with the intake-side check valve 63. The intake-side check valve 63 is formed in a cylindrical shape whose outer diameter is smaller than an inner diameter of the intake flow path P1, and the intake-side check valve 63 a hemispherical-shaped lower end, which is provided on an axis thereof with a concave portion 63a. On the other hand, the elastic support portion 68 is formed in a meander shape curved alternatively to the left and right and may undergo elastic deformation freely in the upper and lower direction along the flow path P.

The intake flow path P1 is provided, on an inner circumferential surface thereof that is located on the upstream side (i.e., the container 2 side) of the pump hole 34, integrally with a valve seat 69, which is formed in a tapered (conical) surface shape whose diameter decreases toward the lower side of the intake flow path P1. In the state where the intake-side check valve 63 is urged by the elastic support portion 68, the intake-side check valve 63 abuts, from the upper side of the valve seat 69, against the valve seat 69 on the upstream side of the pump hole 34, thereby closing the intake flow path P1. With the above configuration, the intake-side check valve 63 serves as the check valve that permits flow of the liquid in the flow path P from the upstream side relative to the pump hole 34, that is to say, permits flow of the liquid in the intake flow path P1 from the container 2 side to the pump 31 side and that prevents flow of the liquid in the intake flow path P1 from the pump 31 side to the container 2 side.

On the other hand, the dispenser-side check valve 64 may also be called the umbrella valve, which is formed in an umbrella shape that protrudes upward from an upper end of the joining portion 66 and that has an outer diameter increasing gradually as it extends upward. The dispenser-side check valve 64 is disposed on the downstream side (i.e., the upper side in the figure) of the pump hole 34 in the flow path P. The dispenser-side check valve 64 may undergo elastic deformation freely in the radial direction and has an outer circumferential end that contacts the inner circumferential surface of the flow path P, thereby closing the flow path P. The bar-shaped portion 67, on a base end side thereof, is partially disposed on the inner side of the discharge-side check valve 64. With the outer circumferential end undergoing diameter reduction and deformation to be away from the inner circumferential surface of the flow path P, the discharge-side check valve 64 serves as the check valve that permits flow of the liquid in the flow path P from the pump hole 34 to the downstream side, that is to say, permits flow of the liquid in the delivery flow path P2 from the pump 31 side to the nozzle 21 side. With the outer circumferential end abutting against the inner circumferential surface of the flow path P, the discharge-side check valve 64 also serves as the check valve that prevents flow of the liquid in the delivery flow path P2 from the nozzle 21 side to the pump 31 side.

The above valve member 61, which is provided in the flow path P, controls the liquid to flow in the direction from the container 2 side to the nozzle 21 side in the flow path P at the time of actuation of the pump 31. That is to say, when the pump 31 starts discharge operation in response to operation of the trigger T, the liquid within the pump 31 is pressurized and discharged to the flow path P through the pump hole 34. At this time, as the liquid is discharged into the flow path P through the pump hole 34, pressure of the liquid causes elastic deformation of the discharge-side check valve 64 in a direction in which the diameter is reduced, thereby opening the discharge-side check valve 64. Then, the liquid is pressure-fed in the delivery flow path P2 from the pump 31 to the nozzle 21. On the other hand, the intake-side check valve 63 remains pressed against the valve seat 69 by the elastic support portion 68, and accordingly, flow of the liquid from the pump 31 side to the container 2 side is prevented by the intake-side check valve 63. Thus, it is ensured that the liquid within the pump 31 may be pressure-fed from the container 2 to the nozzle 21 due to discharge operation of the pump 31.

In contrast, when the pump 31 starts intake operation in response to releasing of operation of the trigger T, the pump 31 is placed under negative pressure, and the intake-side check valve 63 is displaced in the direction away from the valve seat 69 to be opened. Then, the liquid contained in the container 2 is drawn into the pump 31 (the cylinder 32) through the intake flow path P1 and the pump hole 34. At this time, the discharge-side check valve 64 remains closed, and flow of the liquid in the flow path P from the nozzle 21 side to the pump 31 side is prevented by the discharge-side check valve 64. Thus, it is ensured that the liquid contained in the container 2 may be drawn to the pump 31 due to intake operation of the pump 31.

Figure 4:
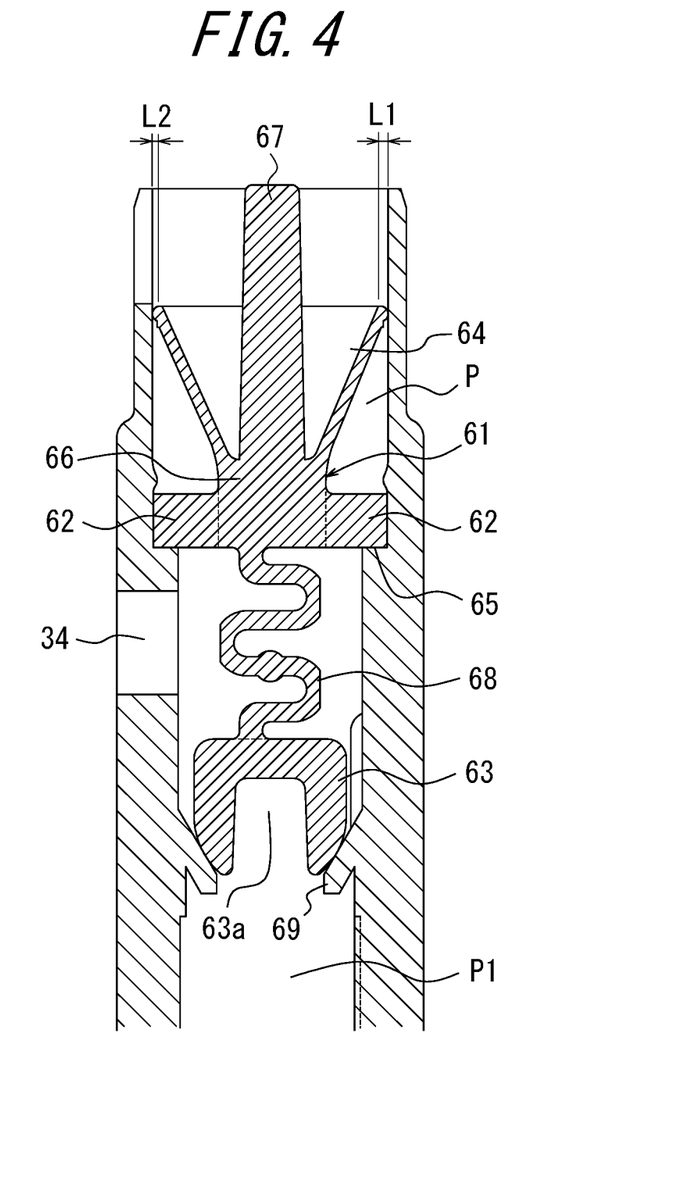
FIG. 4 is a sectional view illustrating the state where an umbrella-shaped portion is in contact with an inner circumferential surface of a flow path.

FIG. 4 is a sectional view illustrating the state where the umbrella-shaped portion is in contact with the inner circumferential surface of the flow path.

In the present disclosure, as described above, the discharge-side check valve 64 is formed in the umbrella shape that may undergo elastic deformation freely in the radial direction, and the outer circumferential end having the largest outer diameter in the discharge-side check valve 64 contacts the inner circumferential surface of the flow path P over the entire circumference thereof in an unbalanced manner, with contact force not distributed uniformly but distributed non-uniformly in the circumferential direction.

For example, in the present embodiment illustrated in FIG. 4, the discharge-side check valve 64 has an axis that is offset from an axis of the cylindrical-shaped flow path P, and a contact allowance L1, which is a contact allowance of the outer circumferential end of the discharge-side check valve 64 with respect to the inner circumferential surface of the flow path P as illustrated on the right side in FIG. 4, is larger than a contact allowance L2, which is another contact allowance of the outer circumferential end of the discharge-side check valve 64 with respect to the inner circumferential surface of the flow path P as illustrated on the left side in FIG. 4. Consequently, contact force of the discharge-side check valve 64 with respect to the inner circumferential surface of the flow path P is distributed non-uniformly in the circumferential direction.

The configuration by which the outer circumferential end of the discharge-side check valve 64 contacts the inner circumferential surface of the flow path P with contact pressure distributed non-uniformly in the circumferential direction is not limited to the one illustrated in FIG. 4 and may be changed in various ways.

Figure 5A:
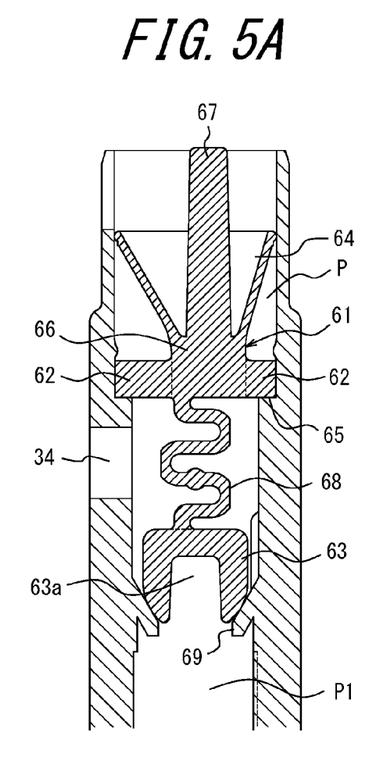
FIGS. 5A and 5B are each a sectional view of a modification of a valve member illustrated in FIG. 4.

For example, as in a modification illustrated in FIG. 5A, the discharge-side check valve 64 may also be shaped in a manner such that a center position of the outer circumferential end thereof is offset from a center position of an inner circumferential end thereof, which is the lowermost portion of the discharge-side check valve 64 that is connected to the joining portion 66. That is to say, the discharge-side check valve 64 may be formed in an oblique conical shape whose axis is inclined with respect to the axis of the flow path P. In this case, distances from the joining portion 66 to various positions of the outer circumferential end of the discharge-side check valve 64 in the circumferential direction are different from each other, and consequently, the outer circumferential end of the discharge-side check valve 64 contacts the inner circumferential surface of the flow path P with contact pressure distributed non-uniformly in the circumferential direction. Additionally, the outer circumferential end of the discharge-side check valve 64 is preferably formed to be perpendicular to the axis of the flow path P. In this case, a contact allowance of the outer circumferential end of the discharge-side check valve 64 with respect to inner circumferential surface of the flow path P may be defined to be either uniform or non-uniform around the circumference.

Figure 5B:
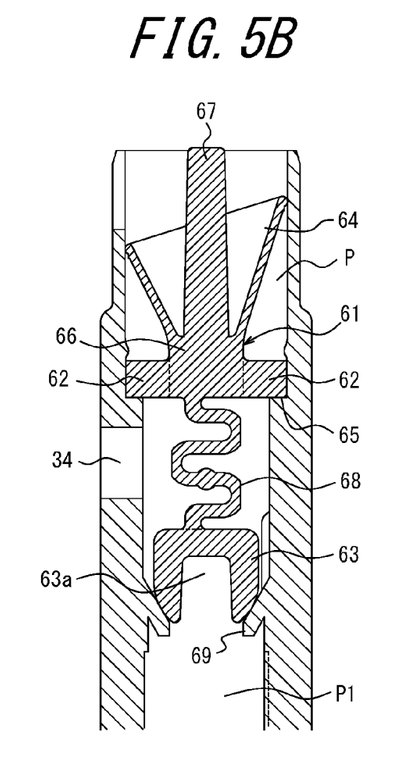

Furthermore, as in another modification illustrated in FIG. 5B, the discharge-side check valve 64 may be shaped in a manner such that the outer circumferential end thereof is inclined with respect to a surface extending perpendicularly to a direction of the axis of the flow path P. In this case also, distances from the joining portion 66 to various positions of the outer circumferential end of the discharge-side check valve 64 in the circumferential direction are different from each other, and consequently, the outer circumferential end of the discharge-side check valve 64 contacts the inner circumferential surface of the flow path P with contact pressure distributed non-uniformly in the circumferential direction. In this case also, a contact allowance of the outer circumferential end of the discharge-side check valve 64 with respect to inner circumferential surface of the flow path P may be defined to be either uniform or non-uniform around the circumference.

Thus, owing to the configuration by which the outer circumferential end of the discharge-side check valve 64 contacts the inner circumferential surface of the flow path P with contact pressure distributed non-uniformly in the circumferential direction, when pressure of the liquid discharged from the pump 31 is applied to the discharge-side check valve 64 due to discharge operation of the pump 31, the applied pressure causes the discharge-side check valve 64 not to undergo generally uniform diameter reduction and deformation, but instead to undergo diameter reduction and deformation starting from a portion of the discharge-side check valve 64 in which contact pressure with respect to the inner circumferential surface of the flow path P is small. That is to say, an easy-to-deform portion is created in the discharge-side check valve 64, and deformation of the easy-to-deform portion prompts the entire discharge-side check valve 64 to be opened with less pressure. This means that opening pressure for the discharge-side check valve 64 is reduced, and accordingly, operation force needed to be applied to the trigger T for actuating the pump 31 is reduced at the time of dispensing the liquid through the nozzle 21 by actuating the pump 31 in response to operation of the trigger T, and operation of the trigger-type liquid dispenser 1 becomes more effortless and facilitated.

Needless to say, the present disclosure is not limited to the above embodiment, and various changes may be made without departing the gist of the present disclosure.

For example, the pump 31 does not need to have the configuration illustrated with respect to the above embodiment and may have any of a variety of configurations, which permit the pump 31 to be actuated in response to operation of the trigger T to draw and discharge the liquid from and to the flow path P through the pump hole 34.

Furthermore, the intake-side check valve 63 does not need to have the configuration illustrated with respect to the above embodiment and may have any of a variety of configurations, which permit the intake-side check valve 63 to serve as the check valve that opens and closes the intake flow path P1.

REFERENCE SIGNS LIST

1 Trigger-type liquid dispenser
2 Container
2a Mouth
11 Dispenser main body
12 Fitted tubular portion
13 Fitting cap
14 Sealing member
15 Standing portion
16 Extension portion
16a Fitting tube
17 Tube
18 Delivery port
21 Nozzle
21a Nozzle cover
31 Pump
32 Cylinder
33 Piston
34 Pump hole
41 Pivot shaft
42 Pin member
43 Plate spring
44 Cover
51 Upright and inverted dual mechanism
52 Check valve unit
52a Valve body
52b Valve chamber
52c Outlet hole
52d Inlet hole
52e Flow path used during inversion
61 Valve member
62 Fix portion
63 Intake-side check valve
63a Concave portion
64 Discharge-side check valve
65 Stepped portion
66 Joining portion
67 Bar-shaped portion
68 Elastic support portion
69 Valve seat
P1 Intake flow path
P2 Delivery flow path
P Flow path
T Trigger
L1 Contact allowance
L2 Contact allowance

The invention claimed is:

1. A liquid dispenser comprising:
a dispenser main body fitted to a mouth of a container containing liquid,
a nozzle fitted to a front end of a flow path provided in the dispenser main body,
a pump that is connected to a pump hole provided in a midway portion of the flow path and that is actuated in response to operation of a trigger, and
a valve member that is provided in the flow path to control the liquid to flow in a direction from the container to the nozzle in the flow path in conjunction with actuation of the pump, wherein
the valve member includes:
an intake-side check valve that is disposed on an upstream side of the pump hole in the flow path to permit flow of the liquid from a container side to a pump side and to prevent flow of the liquid from the pump side to the container side, and
a discharge-side check valve that is disposed on a downstream side of the pump hole in the flow path to permit flow of the liquid from the pump side to a nozzle side and to prevent flow of the liquid from the nozzle side to the pump side, and wherein:
the discharge-side check valve is formed in an umbrella shape with a uniform thickness in the circumferential direction that is elastically deformable freely in a radial direction thereof, and the discharge-side check valve has an outer circumferential end configured to contact an inner circumferential surface of the flow path, and
a contact force of the outer circumferential end with respect to the inner circumferential surface of the flow path is distributed non-uniformly in a circumferential direction by offsetting an axis of the discharge-side check valve from an axis of the flow path.

2. The liquid dispenser according to claim 1, wherein the valve member further includes a fixed portion configured to be fixed in the flow path, and the intake-side check valve and the discharge-side check valve are provided integrally with the fixed portion.

3. The liquid dispenser according to claim 2, wherein the intake-side check valve is provided on a tip of an elastic support portion protruding from the fixed portion and configured to abut against a valve seat provided in the flow path.

4. The liquid dispenser according to claim 2, wherein the discharge-side check valve is provided inside thereof with a bar-shaped portion, and the valve member is fixed in the flow path by the bar-shaped portion abutting against an inner wall of the flow path and by the fixed portion engaging with a stepped portion formed on the inner circumferential surface of the flow path.

5. The liquid dispenser according to claim 4, wherein the intake-side check valve is provided on a tip of an elastic support portion protruding from the fixed portion and configured to abut against a valve seat provided in the flow path.

6. A liquid dispenser comprising:
a dispenser main body fitted to a mouth of a container containing liquid,
a nozzle fitted to a front end of a flow path provided in the dispenser main body,
a pump that is connected to a pump hole provided in a midway portion of the flow path and that is actuated in response to operation of a trigger, and
a valve member that is provided in the flow path to control the liquid to flow in a direction from the container to the nozzle in the flow path in conjunction with actuation of the pump, wherein
the valve member includes:
an intake-side check valve that is disposed on an upstream side of the pump hole in the flow path to permit flow of the liquid from a container side to a pump side and to prevent flow of the liquid from the pump side to the container side, and
a discharge-side check valve that is disposed on a downstream side of the pump hole in the flow path to permit flow of the liquid from the pump side to a nozzle side and to prevent flow of the liquid from the nozzle side to the pump side, and wherein:
the discharge-side check valve is formed in an umbrella shape that is elastically deformable freely in a radial direction thereof, and the discharge-side check valve has an outer circumferential end configured to contact an inner circumferential surface of the flow path, with contact force of the outer circumferential end with respect to the inner circumferential surface of the flow path being distributed non-uniformly in a circumferential direction thereof, and the discharge-side check valve is shaped in a manner such that a center position of the outer circumferential end thereof is offset from a center position of an inner circumferential end thereof.

7. The liquid dispenser according to claim 6, wherein the valve member further includes a fixed portion configured to be fixed in the flow path, and the intake-side check valve and the discharge-side check valve are provided integrally with the fixed portion.

8. The liquid dispenser according to claim 7, wherein the intake-side check valve is provided on a tip of an elastic support portion protruding from the fixed portion and configured to abut against a valve seat provided in the flow path.

9. The liquid dispenser according to claim 7, wherein the discharge-side check valve is provided inside thereof with a bar-shaped portion, and the valve member is fixed in the flow path by the bar-shaped portion abutting against an inner wall of the flow path and by the fixed portion engaging with a stepped portion formed on the inner circumferential surface of the flow path.

10. The liquid dispenser according to claim 9, wherein the intake-side check valve is provided on a tip of an elastic support portion protruding from the fixed portion and configured to abut against a valve seat provided in the flow path.

11. A liquid dispenser comprising:
a dispenser main body fitted to a mouth of a container containing liquid,
a nozzle fitted to a front end of a flow path provided in the dispenser main body,
a pump that is connected to a pump hole provided in a midway portion of the flow path and that is actuated in response to operation of a trigger, and
a valve member that is provided in the flow path to control the liquid to flow in a direction from the container to the nozzle in the flow path in conjunction with actuation of the pump, wherein
the valve member includes:
an intake-side check valve that is disposed on an upstream side of the pump hole in the flow path to permit flow of the liquid from a container side to a pump side and to prevent flow of the liquid from the pump side to the container side, and
a discharge-side check valve that is disposed on a downstream side of the pump hole in the flow path to permit flow of the liquid from the pump side to a nozzle side and to prevent flow of the liquid from the nozzle side to the pump side, and wherein:
the discharge-side check valve is formed in an umbrella shape that is elastically deformable freely in a radial direction thereof, and the discharge-side check valve has an outer circumferential end configured to contact an inner circumferential surface of the flow path, with contact force of the outer circumferential end with respect to the inner circumferential surface of the flow path being distributed non-uniformly in a circumferential direction thereof, and
the discharge-side check valve is shaped in a manner such that a plane defined by a discharge-side end face of the discharge-side check valve is inclined with respect to a surface extending perpendicularly to a direction of an axis of the flow path.

12. The liquid dispenser according to claim 11, wherein the valve member further includes a fixed portion configured to be fixed in the flow path, and the intake-side check valve and the discharge-side check valve are provided integrally with the fixed portion.

13. The liquid dispenser according to claim 12, wherein the intake-side check valve is provided on a tip of an elastic support portion protruding from the fixed portion and configured to abut against a valve seat provided in the flow path.

14. The liquid dispenser according to claim 12, wherein the discharge-side check valve is provided inside thereof with a bar-shaped portion, and the valve member is fixed in the flow path by the bar-shaped portion abutting against an inner wall of the flow path and by the fixed portion engaging with a stepped portion formed on the inner circumferential surface of the flow path.

15. The liquid dispenser according to claim 14, wherein the intake-side check valve is provided on a tip of an elastic support portion protruding from the fixed portion and configured to abut against a valve seat provided in the flow path.

* * * * *